United States Patent [19]

Tinder et al.

[11] 4,026,468
[45] May 31, 1977

[54] HEADLAMP CLEANING ASSEMBLY

[75] Inventors: David V. Tinder, Madison Heights; Edwin F. Clemett, Jr., Detroit, both of Mich.

[73] Assignee: McCord Corporation, Detroit, Mich.

[22] Filed: Aug. 14, 1975

[21] Appl. No.: 604,645

[52] U.S. Cl. .............................. 239/66; 91/411 A; 91/412; 137/114; 239/94; 239/99; 239/284 R; 417/523

[51] Int. Cl.² ...................... B05B 1/08; B60S 1/46; F15B 11/20; F15B 13/02

[58] Field of Search ................ 239/66, 93, 94, 99, 239/101, 284, 70; 15/250.01; 137/88, 111–114; 91/4 R, 35, 38, 355, 395, 411 A, 412; 60/394, 410, 413, 415; 417/391, 403, 437, 523, 545, 549

[56] References Cited

UNITED STATES PATENTS

| 3,169,676 | 2/1965 | Hanselmann | 239/284 X |
|---|---|---|---|
| 3,356,101 | 12/1967 | Tacchi | 137/88 X |
| 3,593,015 | 7/1971 | Marchant | 239/284 X |
| 3,872,670 | 3/1975 | Dezelan et al. | 60/413 |

Primary Examiner—Johnny D. Cherry
Assistant Examiner—Andres Kashnikow
Attorney, Agent, or Firm—McGlynn and Milton

[57] ABSTRACT

A headlamp cleaning assembly of the type for cleaning vehicle headlamps and including first and second nozzles for jetting an air/liquid mixture against a headlight surface. A regulator means is included for mixing air and liquid and for sequentially supplying the resultant air/liquid mixture to the first nozzle for a first period of time and then to the second nozzle for a second period of time to complete one cycle. The regulator includes a piston slidably disposed in a cavity to define an air/liquid mixing chamber which is opposed by a liquid charging chamber. The piston also defines an air actuation chamber which, when supplied air, moves the piston from a start position to a charged position to charge by filling the charging chamber with liquid. A stem is connected to and extends upwardly from the piston and is slidably disposed in a stem chamber for actuating an air valve which, in turn, allows pressurized air to flow into the stem chamber. A selector valve is in fluid communication with the stem chamber for selectively controlling the flow of the air/liquid mixture between the first and second nozzles. A porting valve is in fluid communication with the stem chamber through an accumulator chamber and is responsive to air pressure in the stem chamber for moving to an open position to allow air pressure to flow to the mixing chamber to drive the piston against the liquid charged chamber so that liquid will flow through a check valve and a timing and atomizing nozzle into the mixing chamber. Also included is a manually actuated control valve which is actuatable to allow air pressure to flow to the air actuating chamber to initiate a cycle.

17 Claims, 9 Drawing Figures

HEADLAMP CLEANING ASSEMBLY

The subject invention relates to a headlamp cleaning assembly of the type for cleaning vehicle headlamps. More specifically, the subject invention relates to a cleaning system of the type utilizing a nozzle including a flexible tube having a free end for emitting a high velocity mixture of air and liquid. The tube is anchored at a point spaced from its emitting end and a high velocity mixture of air and liquid is supplied to the tube. The emitting end of the tube is restricted in its movement whereby the emitting end of the tube moves between predetermined limits. Such a nozzle configuration is more specifically described in co-pending application Ser. No. 550,542 filed Feb. 18, 1975 in the name of John D. Vogel and assigned to the assignee of the subject invention.

In accordance with the subject invention, two such nozzles are utilized for cleaning a surface, such as headlamp surface of an automotive vehicle, and there is included a regulator means for mixing air and liquid and for sequentially supplying the resultant air/liquid mixture to the first nozzle for a first period of time and then to the second nozzle for a second period of time during one complete cycle. The assembly is particularly suited for use with vehicles having a supply of air such as large trucks which utilize air systems for brakes and the like. The regulator includes a piston slidably disposed in a cavity to define an air/liquid mixing chamber which is opposed by a liquid charging chamber. The piston also defines an air actuation chamber which, when supplied air, moves the piston from a start position to a charged position to charge the charging chamber with liquid. A stem is connected to and extends upwardly from the piston and is slidably disposed in a stem chamber for actuating an air valve which, in turn, allows pressurized air to flow into the stem chamber. A selector valve is in fluid communication with the stem chamber for selectively controlling the flow of the air/liquid mixture to the first and second nozzles. A porting valve is in fluid communication with the stem chamber through an accumulator chamber and is responsive to air pressure in the stem chamber for moving to an open position to allow air pressure to flow to the mixing chamber to drive the piston against the liquid charged chamber so that liquid will flow into the mixing chamber through a check valve and a nozzle or orifice. A manually actuated control valve is actuatable to allow air pressure to flow to the air actuating chamber to initiate a cycle.

Other advantages of the present invention will be readily appreciated as the same becomes better understood by reference to the following detailed description when considered in connection with the accompanying drawings wherein.

Figure 1:
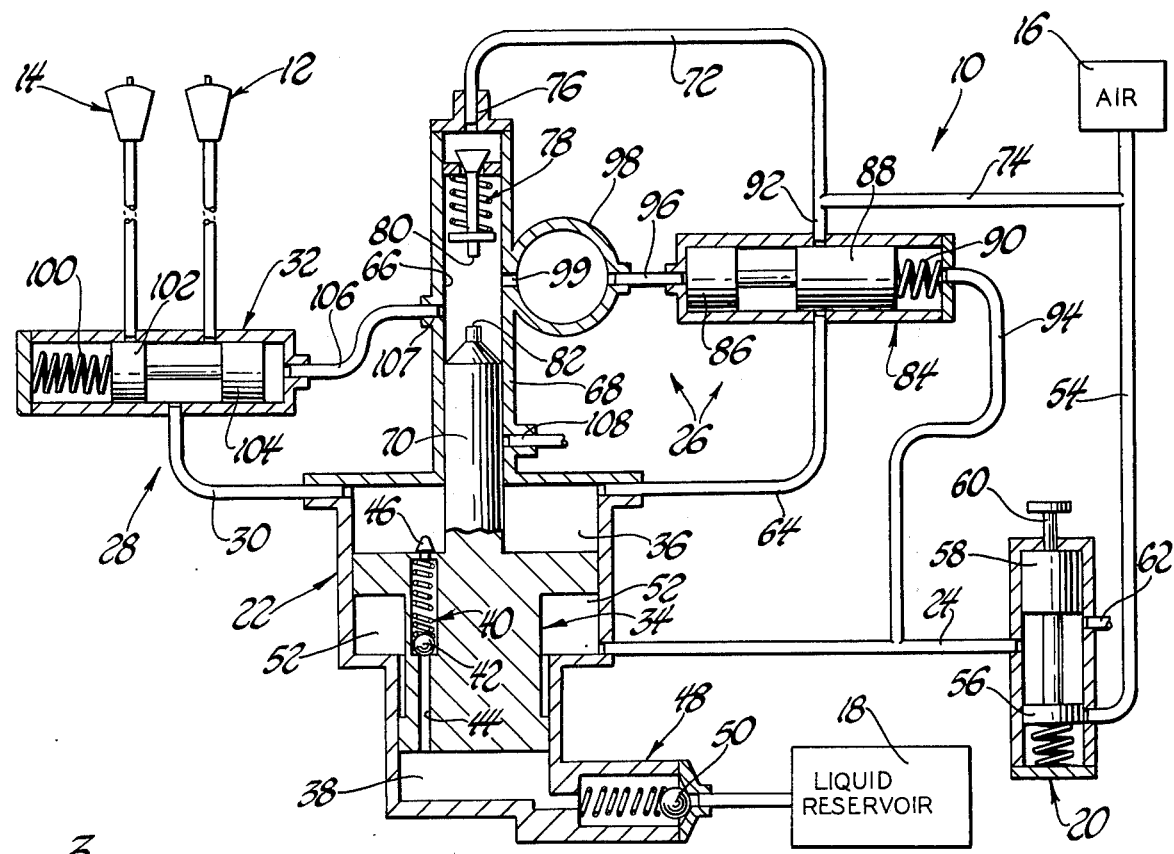
FIG. 1 is a schematic illustration of the air/liquid cleaning system of the subject invention.

Referring to the drawings, a complete description will first be made in regard to the schematic illustration of the system as set forth in FIG. 1 and thereafter a corresponding or correlating description will be made of the preferred embodiment shown in FIGS. 2 through 9.

A headlamp cleaning assembly for cleaning vehicle headlamps in accordance with the subject invention is generally shown at 10 in FIG. 1. The assembly 10 includes first and second nozzles generally indicated at 12 and 14 respectively. The nozzles 12 and 14 are of the type described hereinbefore wherein a flexible tube is anchored in a generally fan-shaped restraining means and has a free emitting end extending from the restraining means for moving in response to an air/liquid mixture being ejected therefrom for jetting the air/liquid mixture against a headlamp surface. The first nozzle 12 is disposed below the headlamp surface for jetting the air/liquid mixture onto the headlamp surface from below and the second nozzle 14 is disposed above the headlamp surface for jetting the air/liquid mixture onto the headlamp surface from above.

The assembly 10 includes a regulator means for mixing air and liquid and for sequentially supplying the resultant air/liquid mixture to the first nozzle 12 for a first period of time and then to the second nozzle 14 for a second period of time during one complete cycle. The air is supplied from a source of pressurized air 16 and the liquid is supplied from a liquid reservoir 18. The liquid may comprise water mixed with a cleaning solvent.

The assembly 10 includes a manually actuatable control means generally indicated at 20 for actuating the regulator means to initiate each cycle.

The regulator means includes an air/liquid mixing means, generally indicated at 22, and movable between a start position and a liquid charged position. Also included is an energy transfer means comprising the fluid passage means 24 for moving the mixing means 22 from the start position to the liquid charged position in response to actuation of the control means 20.

The regulator means includes an air supply means, generally shown at 26, for supplying air to the air/liquid mixing means 22 for the mixture thereof with liquid in response to the mixing means 22 reaching the charged position and for moving the mixing means 22 from the charged position to the start position. Also included is a fluid passage means, generally shown at 28, for conveying the air/liquid mixture from the mixing means 22 to the first and second nozzles 12 and 14. The fluid passsage means 28 includes a fluid passage 30 and a selector valve means, generally indicated at 32, for directing the air/liquid mixture to the first nozzle 12 for the first period of time in response to a predetermined position of the mixing means 22 during movement thereof from the charged position to the start position and for thereafter directing the air/liquid mixture to the second nozzle 14 during the second period of time.

The air/liquid mixing means 22 includes a housing defining a cavity and a piston means, generally indicated at 34, slidably disposed in the cavity to define a mixing chamber 36 above the piston means 34 and a charging chamber 38 below the piston means 34. The piston means 34 is shown at a position mid-way between the start position and the charged position, the start position being that where the piston means 34 is bottomed-out minimizing the volume in the charging chamber 38 and the charged position being that where the piston means 34 is at the extreme upward travel to minimize the volume in the mixing chamber 36. A first valving means generally indicated at 40 allows liquid to flow from the charging chamber 38 to the mixing chamber 36 as the piston means 34 moves from the upward charged position downwardly to the start position. The valving means 40 includes a ball check valve 42 which allows liquid to flow upwardly through the passage 44 but prevents return flow and an atomizer or timing means 46 for injecting atomized liquid into the mixing chamber 36 as the piston means 34 moves downwardly from the charged position towards the start position. The atomizing nozzle 46 is also a timing orifice which controls the rate of liquid flow from the charging chamber 38 to the mixing chamber 36 and therefore controls the rate of piston movement to thereby determine a cycle time. The ball check valve 42 is biased to a seating position by a spring.

The fluid passage 30 is in fluid communication with the mixing chamber 36 for conveying the air/liquid mixture from the mixing chamber 36 through the selector valve means 32 to one of the nozzles 12 or 14.

A liquid inlet means, generally indicated at 48, is disposed between the liquid reservoir 18 and the charging chamber 38 for supplying liquid to the charging chamber 38 during movement of the piston means 34 upwardly from the start position toward the charged position and for preventing reverse flow of liquid from the charging chamber 38 through the inlet means 48. The inlet means 48 includes a ball check valve 50 biased to a seated position by a spring.

The piston means 34 also defines an air actuation chamber 52 within the cavity in which the piston means 34 is slidably disposed. The air actuation chamber 52 receives pressurized air from the fluid passage 24 to move the piston means 34 from the start position upwardly to the charged position,.

The upper surface of the piston means 34 defining the area exposed to the mixing chamber 36 is larger in area than the area of the piston means 34 exposed to the charging chamber 38 so that sufficient pressure or force is applied to the piston in the mixing chamber 36 to force it downwardly to apply sufficient pressure or force to the liquid in the charging chamber 38 to force the liquid up through the passage 44 past the check valve 42 and out the atomizing and/or timing nozzle 46.

The control means 20 comprises a manually actuated air flow control valve adapted through fluid passage 54 to be connected to the source of pressurized air 16. The control valve is defined by a shuttle valve having spools 58 and 56 interconnected by a shaft and a manually actuatable plunger 60. The spools 56 and 58 are slidably supported in sealing relationship with a housing which includes a vent to atmosphere 62. The fluid passage 24 interconnects the control valve 20 and the air actuation chamber 52 for supplying air to the air actuation chamber 52 upon actuation of the control valve 20 for moving the piston means 34 from the start position to the charged position. The vent 62 vents the fluid passage 24 and the air actuation chamber 52 during movement of the piston means 34 downwardly from the charged position to the start position. The control valve 20 is shown in the normal at-rest position where a spring biases the spools 56 and 58 upwardly whereby the line 24 is in communication with the vent 62 and high pressure air is prevented from entering the valve through the line 54 because of the position of the spool 56. Upon manual actuation of the control valve 20, the spools 56 and 58 move downwardly whereby the vent 62 is closed off and air pressure enters the line 54 and flows out through the fluid passage 24 to the air actuation chamber 52.

The air supply means 26 is in fluid communication with the mixing chamber 36 through the fluid passage 64. The air supply means 26 includes a stem chamber 66 defined by a housing portion 68 extending upwardly from the housing of the mixing means 22. A stem 70 is slidably supported in sealing engagement with the stem chamber and is connected to the piston means 34 for movement therewith between the start and charged positions. Fluid passage means 72 is connected through the passage 74 to the source of pressurized air 16 and is in fluid communication at 76 with the stem chamber 66. However, an air valve means generally indicated at 78 is disposed in the stem chamber 66 and is actuatable by the upper end of the stem 70 for allowing air from the fluid passage 72 to flow into the stem chamber 66 when the piston means 34 is in the charged position. The air valve means 78 is a poppet type valve biased to the closed or seating position by a spring and having a lower end 80 which may be engaged by a tip 82 at the upper end of the stem 70 for unseating the poppet valve to allow pressurized air to flow in through the stem chamber 66.

The air supply means 26 also includes a porting valve means, generally indicated at 84. The porting valve means 84 includes spaced spools 86 and 88 interconnected by a rod or shaft and biased to the closed position by spring 90. The valve means 84 is movable to an open position against the action of the spring 90 as the spools 86 and 88 move to the right where spool 88 uncovers fluid passage 92 leading from fluid passage 74 and the source of pressurized air 16 to allow pressurized air to flow out the fluid passage 64 and into the mixing chamber 36. The chamber surronding the spring 90 and adjacent the spool 88 is connected through a fluid passage 94 to the pressure line 24 which, in turn, leads to the control valve 20. The fluid passageway 92 extends into the porting valve 84 to define an air supply port communicating with the supply of pressurized air 16. There is also included a control port defined by the fluid passage 96 leading into the porting valve 84 and which is in fluid communication with the stem chamber 66 through an accumulator chamber 98 and port 99. The fluid passage 64 defines a mixing chamber port at the porting valve 84 and the line 94 defines a closing port at the porting valve 84.

The closing port defined by the fluid passage 94 is supplied with pressurized air from the control valve 20 upon actuation of the control valve 20 at the same time the line 24 and the air actuation chamber 52 is supplied pressurized air and is vented through the vent means 62 of the control valve along with the air actuation chamber 52 when the control valve 20 is in the unactuated position. Thus, the porting valve 84 is maintained in the closed position as shown when pressurized air is supplied to the closing port through the fluid passage 94 and is allowed to open as the closing port is vented through the fluid passage 94 and the vent 62. The porting valve 84 is movable to the open position by air supplied through the control port defined by the fluid passage 96 to act against the spool 86 to move the spools 86 and 88 to the right against the biasing of the spring 90. As will be appreciated, the mixing chamber port defined by the fluid passage 64 and the air supply port defined by the passage 92 are closed to one another when the porting valve 84 is in the closed position but are open and in fluid communication with one another when the porting valve 84 is in the open position.

The selector valve means 32 is normally biased by the spring 100 to a first position, as shown, where the spool 102 covers the port defined by the fluid passage leading to the nozzle 14 and the spool 104 uncovers the port and fluid passage leading to the nozzle 12 to allow the air/liquid mixture to flow from the fluid passage 30 to the first nozzle 12. The selector valve means 32 is movable to a second position where the spool 102 uncovers the port defined by the fluid passage leading to the nozzle 14 and the spool 104 covers the port defined by the fluid passage leading to the nozzle 12 for directing the air/liquid mixture from the fluid passage 30 to the second nozzle 14.

A fluid passage means 106 interconnects the selector valve means 32 and a timing port 107 in the stem chamber 66 for supplying air from the stem chamber 66 to the selector valve means 32 to act against the spool 104 for moving the selector valve means from the first position, as shown, to the second position when the timing port 107 is uncovered by the stem 70. More specifically, the stem 70, when in the uppermost or charged position, covers the port 107 but as the stem 70 moves downwardly it uncovers the port 107 to allow pressure from the stem chamber 66 to flow through the fluid passage 106 and act against the spool 104 to move the spools 102 and 104 to the left to divert the flow of air/liquid mixture from the first nozzle 12 to the second nozzle 14. In other words, the timing port 107 is disposed in the stem chamber 66 at a position which is approximately midway between the extremes of travel of the stem 70 whereby the stem 70 uncovers the timing port 107 during movement from the charged position downwardly to the start position to divert the flow of air/liquid from the first nozzle 12 to the second nozzle 14 approximately midway through the cycle. The accumulator chamber 98 accumulates pressurized air when it is admitted into the stem chamber 66 through the air valve means 78 and supplies such air pressure to the selector valve means 32 as the port 107 is opened and otherwise maintains sufficient pressure in the stem chamber 66.

The stem chamber 66 includes a vent port 108 for venting the stem chamber 66 as the vent port 108 is uncovered by the stem 70. The vent port 108 is positioned so as to be uncovered by the stem 70 when the stem 70 is adjacent the lowermost or start position. As will be appreciated, venting of the stem chamber 66 also vents the fluid passages 96 and 106 as well as the accumulator chamber 98.

OPERATION OF FIG. 1 SCHEMATIC

The control valve 20 is normally positioned within the passenger compartment of a vehicle for actuation by the vehicle operator. The operator depresses the plunger 60 to supply pressurized air from the fluid passage 54 to the fluid passages 24 and 94. The fluid pressure in the line 94 maintains the porting valve 84 in the closed position preventing pressurized air from flowing through the fluid passage 64 to the mixing chamber 36. Pressurized air is, however, supplied to the air actuation chamber 52 forcing the piston means 34 to move upwardly. As the piston means 34 moves upwardly, liquid is sucked into the charging chamber 38 from the liquid reservoir 18 past the liquid inlet means 48. As the piston means 34 moves upwardly, the stem 70 moves upwardly therewith and closes the vent port 108 and the timing port 107. The control valve 20 is held open long enough (which need not be very long at all) to allow a sufficient volume of pressurized air to move into the air actuating chamber 52 to move the piston means 34 upwardly to the charged position where the upper end 82 of the stem 70 contacts the lower end 80 of the air valve means 78 to open the air valve means 78 and pressurize the stem chamber 66 and the accumulator chamber 98. Upon release of the control valve 20 the control valve returns to the position shown in FIG. 1 venting the fluid passages 24 and 94. Pressure from the accumulator chamber 98 acts against the spool 86 of the porting valve 84 to move it to the open position where pressurized air flows from the fluid passage 92 into the fluid passage 64 and into the mixing chamber 36 to move the piston means 34 downwardly. As the piston means 34 moves downwardly, liquid is forced from the charging chamber 38 upwardly through the passage 44 past the check valve 42 and out the atomizer or timer 46 and into the mixing chamber 36. The atomized liquid mixes with air and flows out the fluid passage 30 and through the selector valve 32 to the first nozzle 12, the spool 102 preventing the flow of air/liquid mixture to the second nozzle 14.

Piston means 34 continues to move downwardly from the charged position toward the start position and when the sealing extremity of the stem 70 moves below the timing port 107, air pressure flows through the fluid passage 106 to act against the spool 104 and move the selector valve 32 to the second position diverting the flow of the air/liquid mixture to the second nozzle 14 and closing such flow to the first nozzle 12.

The piston means continues to move downwardly until the stem opens the vent port 108 to vent pressure from the stem chamber 66 completing the cycle. The rate at which the piston means moves downwardly is controlled by the nozzle 46 as it acts as a timing orifice.

DESCRIPTION OF PREFERRED EMBODIMENT OF FIGS. 2 THROUGH 9

A preferred embodiment of the regulator means utilized in the subject invention is shown in FIGS. 2 through 9 and numerals followed by a prime designation will be used to indicate the like, equivalent or similar components described in regard to the schematic illustration of FIG. 1.

The preferred embodiment of the regulator means includes a housing defined by the housing components 110 and 112 which are held together by a generally V-shaped clamp 114 which is, in turn, bolted to a mounting bracket 116 by the bolts 118. A cap 120 is secured to the housing port 112 by the bolts 122.

A piston means is generally indicated at 34' and is shown in the start position and is disposed within a cavity defined by the housing component 110 for movement to the left, as viewed, to the charged position. The piston means 34' includes seals 124 and 126 for sealing engagement with the housing component 110. The piston means 34' defines with the housing component 110 and air/liquid mixing chamber 36', a charging chamber 38' and an air actuation chamber 52'.

A liquid inlet means is generally indicated at 48' and includes a ball check valve 50' for allowing liquid to flow from a liquid reservoir into the charging chamber 38'.

A valving means is generally indicated at 40' and includes a ball check valve 42' and an atomizing or timing nozzle 46' and is held in position by a snap ring 128. The stem 70' has a groove 130 therein coacting with the valve means 40' so as to be held to the piston means 34' by the snap ring 128. The atomizing nozzle 46' is also an orifice to control the flow of liquid therethrough to, in turn, control the rate of movement of the piston means 34'.

An air inlet fitting 132 threadedly engages the housing component 112 and is adapted to be coupled to a source of pressurized air in a vehicle. Pressurized air enters through the attachment 132 and flows out through the fluid passage 134 which is adapted to be coupled to a manually actuated control valve such as that generally indicated at 20 in FIG. 1. A return fluid passage 136 returns air flow from the manually actuated control valve. Thus, the fluid passages 134 and 136 are connected to a control valve such as that indicated at 20 and when the control valve is actuated to initiate a cycle, air pressure from the pressurized passageway 134 flows through the control valve and into the fluid passageway 136. Air pressure supplied to the air passage or port 136 flows through the fluid passage 24' to air actuating chamber 52'. At the same time air pressure is supplied through the fluid passage 94' to the chamber 138 which surrounds the spring 90' and the valve member or port 88' to hold the valve port 88' in the downward position shown in FIG. 5.

Figure 2:
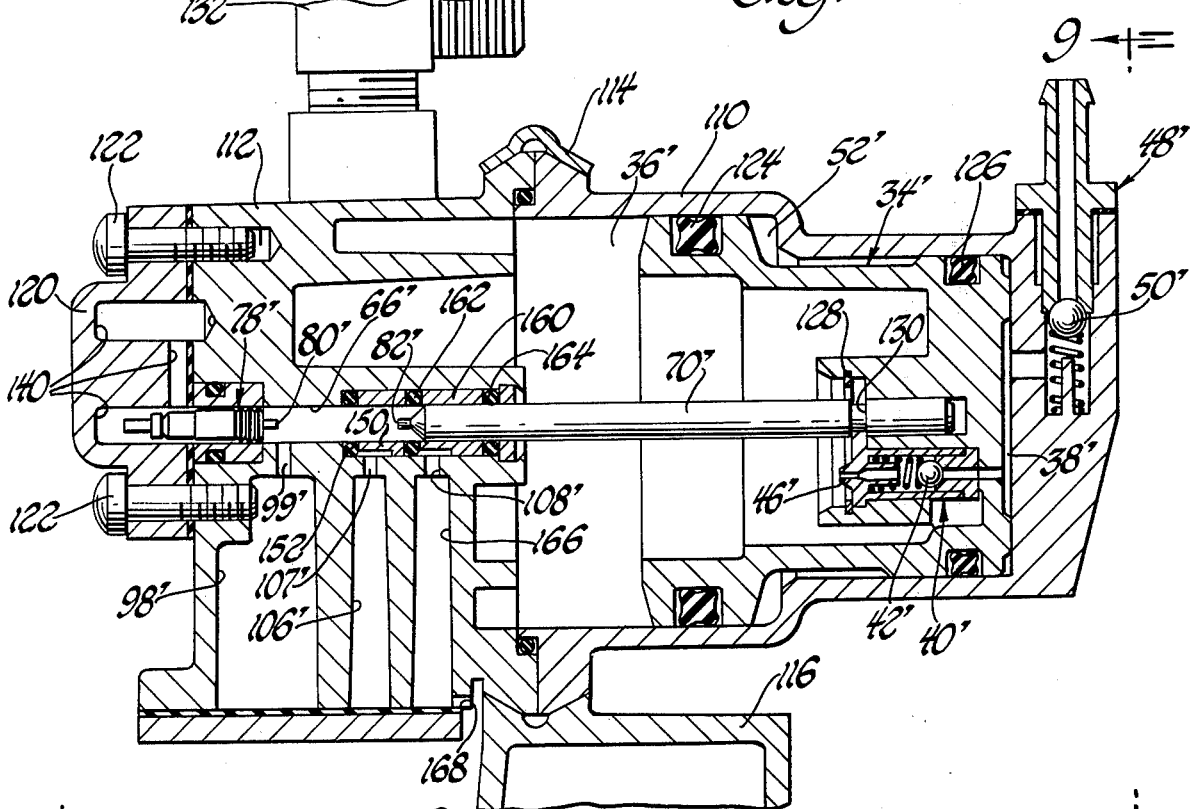
FIG. 2 is a cross-sectional view taken substantially along line 2—2 of FIG. 3 showing a preferred embodiment of the regulator utilized in the subject invention.
Figure 3:
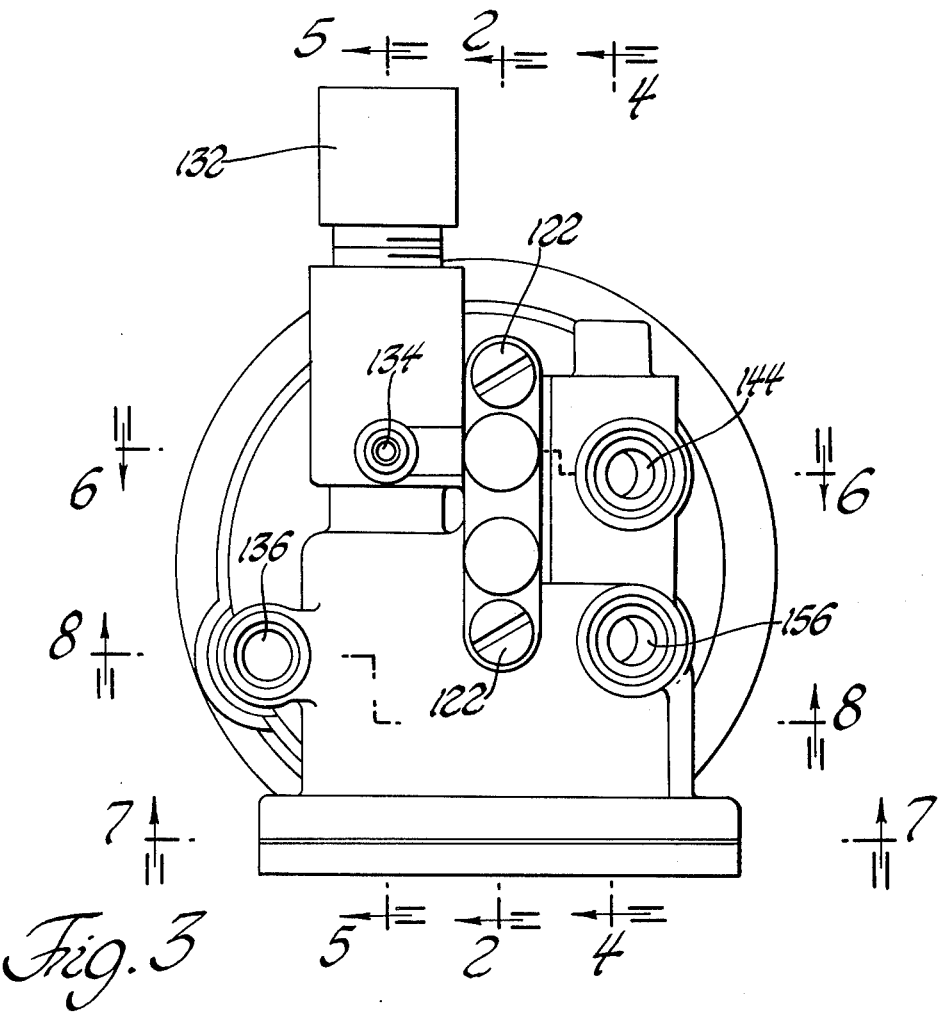
FIG. 3 is an end view taken substantially along line 3—3 of FIG. 2.
Figure 4:
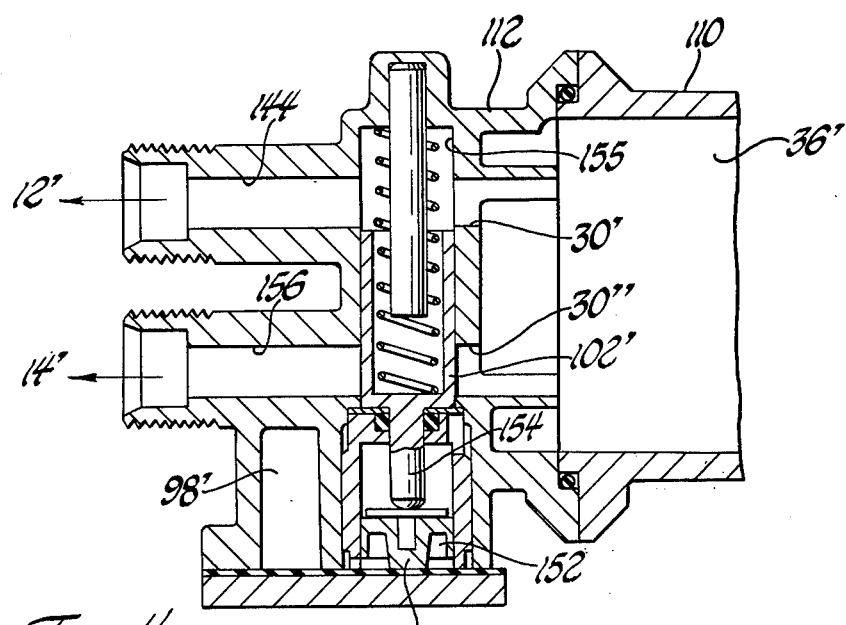
FIG. 4 is a fragmentary cross-sectional view taken substantially along line 4—4 of FIG. 3.
Figure 5:
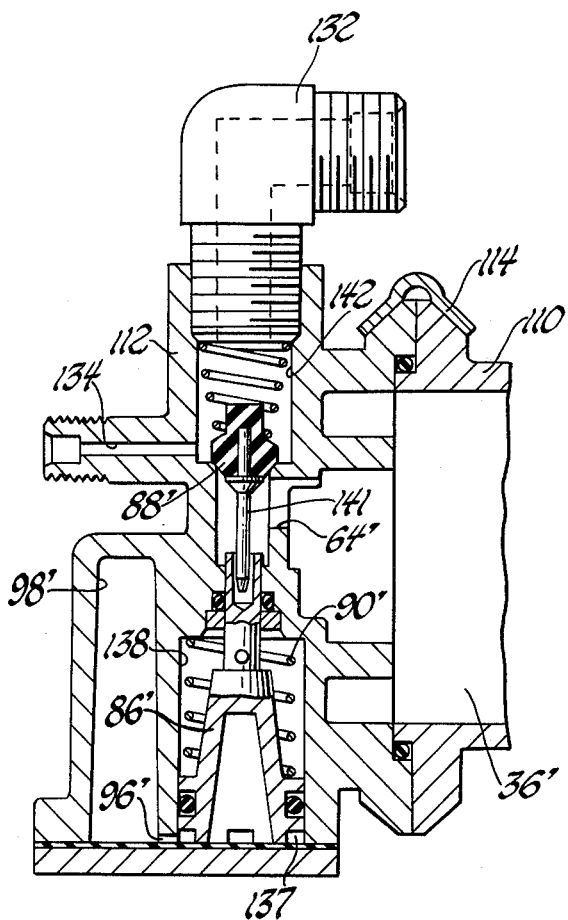
FIG. 5 is a fragmentary cross-sectional view taken substantially along line 5—5 of FIG. 3.
Figure 6:
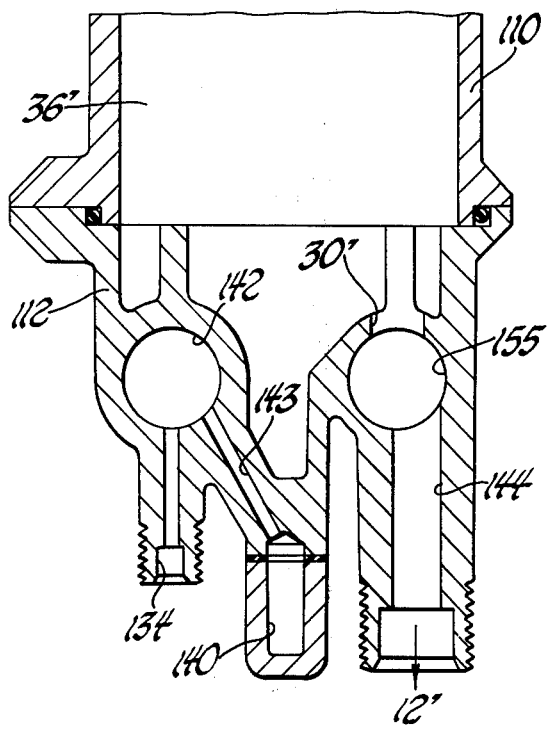
FIG. 6 is a fragmentary cross-sectional view taken substantially along line 6—6 of FIG. 3.
Figure 7:
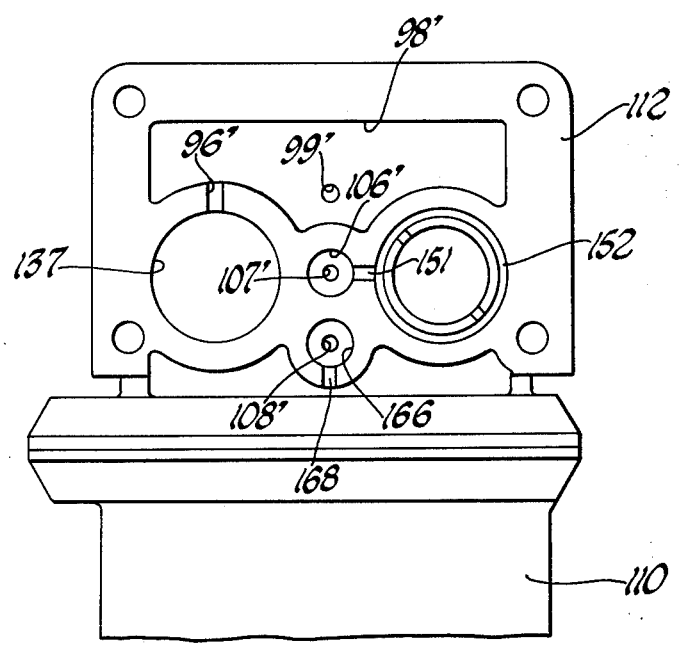
FIG. 7 is a fragmentary view taken substantially along line 7—7 of FIG. 3.
Figure 8:
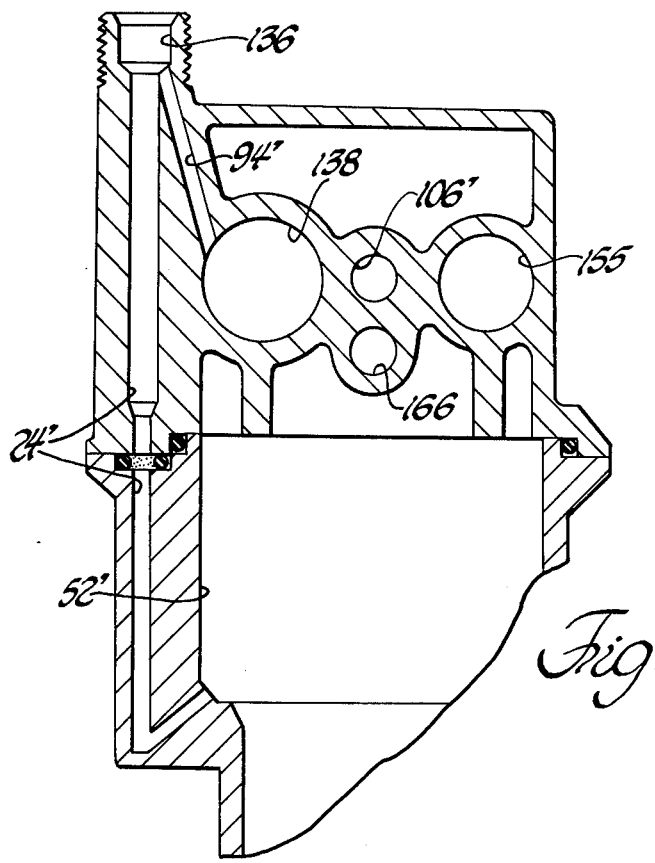
FIG. 8 is a fragmentary cross-sectional view taken substantially along line 8—8 of FIG. 3.
Figure 9:
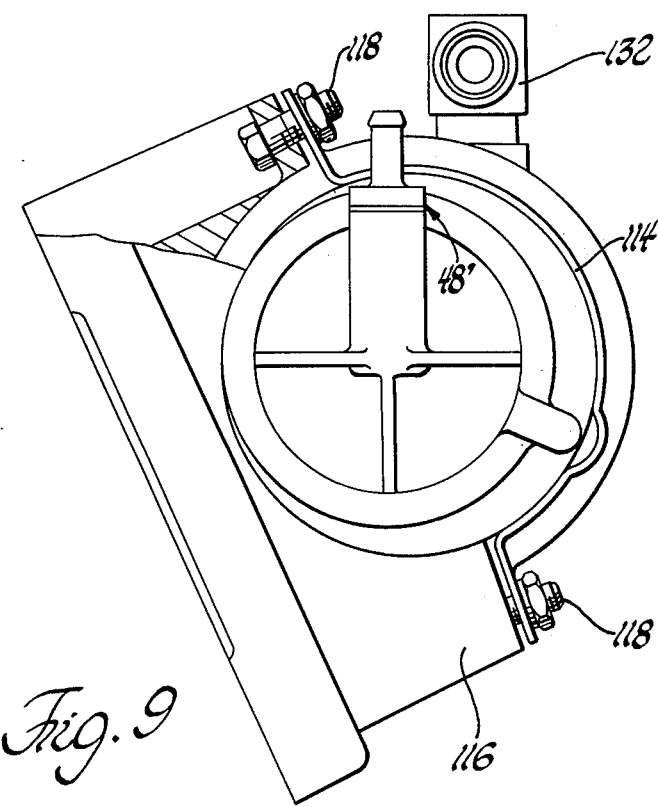
FIG. 9 is an end view taken substantially along line 9—9 of FIG. 2 and partially broken away and in cross section.

The piston means 34' moves from the start position illustrated in FIG. 2 to the left toward the charged position and when it reaches the charged position the end 82' of the stem 70' contacts the end of the needle shaft 80' of the air valve means 78'. The air chamber 140 to the left of the air valve means 78' is in constant communication with the cavity 142, as viewed in FIG. 5, which is constantly pressurized from the air pressure source. The cavity or chamber 142 is in constant fluid communication with the fluid chamber 140 through the fluid passageway 143, as viewed in FIG. 6. The air valve means 78 is preferably of the type utilized in the valve stem of an inflatable tube for an automotive tire. Once the air valve means 78' is opened, air pressure flows therepast from the chamber 140 into the stem chamber 66'. From the stem chamber 66' the air flows through port 99' and into accumulator chamber 98'. Air under pressure then flows through the passage 96' to the underside of the valve member 86'. The fluid passage 96' enters into the chamber 137 below the valve member 86' and establishes communication between chambers 98' and 137. The valve member 86' then moves upwardly against the biasing action of the spring 90' to contact the stem 141 of valve member 88' to move the valve member 88' upwardly to allow air under pressure to flow from the chamber 142 through the port 64' into the mixing chamber 36'.

When the mixing chamber 36' is pressurized with air the piston means 34' starts to move from the charged position toward the start position and liquid is atomized into the mixing chamber 36' through the timing and atomizing nozzle 46'. The resulting air/liquid mixture passes through fluid passage 30' and out through the fluid passageway 144 which is adapted by threads to be connected to a line leading to the first nozzle 12.

As the piston means 34' moves toward the start position the stem 70' also moves toward the start position and approximately midway in its movement, uncovers the port 107'. The port 107' communicates with the stem chamber 66' by way of axially extending slots in the sleeve member 150 and past the O-ring 152. In other words, normally O-ring 152 is in sealing engagement with the stem 70'; however, once the shoulder of the stem 70' uncovers the O-ring 152 air under pressure seeps thereby and down the axial grooves in the sleeve member 150 and out through the port 107' into chamber 106' where it passes through fluid passage 151 and into the chamber 152 to act against the bottom of piston member 104' which, in turn, engages the spindle 154 of the valve member 102' to move the valve member 104' upwardly to close off the passage 30' and, hence, air/liquid mixture flow to the first nozzle 12' and open the fluid passage 30" to allow the air/liquid mixture to pass out through the passage 156 to the second nozzle 14'. The valve member 102' is slidably supported in the chamber 155.

There is also a sleeve 160 disposed in the stem chamber about the stem 70' which abuts O-rings 162 and 164 and has axially extending slots in the outer circumference thereof whereby when the upper shoulder of the stem 70' passes the O-ring 162, air may flow therepast and down the axially extending grooves in the outer surface of the sleeve 160 and through the vent port 108' into the chamber 166. The chamber 166 vents through the passage 168 to the exterior of the assembly.

Once the system is vented it has completed the cycle and is in the start position ready to begin another cycle upon the actuation of the control valve means, as all the components are returned to their initial position.

It is important that the first nozzle 12 be disposed below the headlamp because it is important to impinge the headlamp from below and then from above as gravity abets the flow of cleaning liquid downwardly after the cycle is completed. However, it will be understood that only one nozzle need be utilized and a plurality of nozzles may be oriented in various relationships to one another.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A headlamp cleaning assembly for cleaning vehicle headlamps comprising: first and second nozzles for jetting an air/liquid mixture against a headlamp surface; and regulator means for mixing air and liquid and for sequentially supplying the resultant air/liquid mixture to said first nozzle for a first period of time and then to said second nozzle for a second period of time during one complete cycle; and control means for actuating said regulator means to initiate each of said cycles, said regulator means including air/liquid mixing means movable between a start position and a liquid charged position, energy transfer means for moving said mixing means from said start position to said liquid charged position in response to actuation of said control means, and air supply means for supplying air to said air/liquid mixing means for the mixture thereof with liquid in response to said mixing means reaching said charged position and for moving said mixing means from said charged position to said start position.

2. An assembly as set forth in claim 1 wherein said regulator means includes first fluid passage means for conveying the air/liquid mixture from said mixing means to said first and second nozzles and including selector valve means for directing the air/liquid mixture to said first nozzle for said first period of time and responding to a predetermined position of said mixing means during movement thereof from said charged position to said start position for thereafter directing the air/liquid mixture to said second nozzle during said second period of time.

3. An assembly as set forth in claim 2 wherein said air/liquid mixing means includes a cavity and piston means slidably disposed in said cavity to define a mixing chamber and a charging chamber, said piston means being movable between said start position and said liquid charged position, and first valving means for allowing liquid to flow from said charging chamber to said mixing chamber as said piston means moves from said charged position to said start position.

4. An assembly as set forth in claim 3 wherein said first fluid passage means is in communication with said mixing chamber, and said air supply means is in communication with said mixing chamber.

5. An assembly as set forth in claim 4 including liquid inlet means in fluid communication with said charging chamber for supplying liquid to said charging chamber during movement of said piston means from said start position to said charged position and for preventing reverse flow of liquid from said charging chamber through said inlet means.

6. An assembly as set forth in claim 5 wherein said piston means defines an air actuation chamber within said cavity, said control means comprising an air flow control valve adapted to be connected to a source of pressurized air and movable between unactuated and actuated positions, said energy transfer means comprising a second fluid passage means interconnecting said control valve and said air actuation chamber for supplying air thereto upon actuation of said control valve for moving said piston means from said start position to said charged position, said air flow control valve including vent means for venting said second fluid passage means and said air actuation chamber during movement of said piston means from said charged position to said start position.

7. An assembly as set forth in claim 6 wherein said air supply means includes a stem chamber and a stem slidably supported therein, said stem being connected to said piston means for movement therewith between said start and charged positions, third fluid passage means adapted to be connected to a source of air pressure and in communication with said stem chamber, air valve means disposed in said stem chamber and actuatable by said stem for allowing air from said third fluid passage to flow into said stem chamber when said piston means is in said charged position.

8. An assembly as set forth in claim 7 wherein said air supply means further includes porting valve means movable between open and closed positions and normally biased to said closed position; said porting valve means having an air supply port for communicating with a supply of air, a control port in fluid communication with said stem chamber, a mixing chamber port in fluid communication with said mixing chamber and a closing port in fluid communication with said control valve; said closing port being supplied pressurized air from said control valve upon actuation of said control valve and being vented through said vent means of said control valve when said control valve is in said unactuated position for maintaining said porting valve in said closed position as pressurized air is supplied to said closing port and for allowing said porting valve to open as said closing port is vented; said porting valve being movable to said open position by air supplied through said control port; said mixing chamber port and said air supply port being closed to one another when said porting valve is in said closed position and open to one another when said porting valve is in said open position.

9. An assembly as set forth in claim 8 wherein said selector valve means is normally biased to a first position for directing the air/liquid mixture to said first nozzle, said selector valve means being movable to a second position for directing the air/liquid mixture to said second nozzle, fourth fluid passage means interconnecting said selector valve means and a timing port in said stem chamber for supplying air from said stem chamber to said selector valve means for moving said selector valve means from said first position to said second position when said timing port is uncovered by said stem, said timing port being disposed in said stem chamber at a position between the extremes of travel of said stem whereby said stem uncovers said timing port during movement from said charged position to said start position.

10. An assembly as set forth in claim 9 wherein said air supply means includes an accumulator chamber in fluid communication with said stem chamber.

11. An assembly as set forth in claim 10 wherein said stem chamber includes a vent port for venting said stem chamber as said vent port is uncovered by said stem, said vent port being positioned so as to be uncovered by said stem when said stem is adjacent said start position.

12. An air/liquid mixing assembly comprising: housing means defining a cavity; piston means slidably disposed in said cavity to define a mixing chamber and a charging chamber; said piston means being movable between a start position and a liquid charged position; said piston means having a larger area exposed to said mixing chamber than the area thereof exposed to said charging chamber; and valving means for only allowing liquid to flow from said charging chamber to said mixing chamber as said piston means moves from said charged position to said start position; said piston means defining an air actuation chamber within said cavity for receiving pressurized air to move said piston means from said start position to said charged position; said valving means including timing means for controlling the rate of injecting liquid therethrough and into said mixing chamber as said piston means moves from said charged position to said start position; air supply means for supplying pressurized air to said mixing chamber; first fluid passage means for conveying the air/liquid mixture from said mixing chamber; liquid inlet means in fluid communication with said charging chamber for supplying liquid to said charging chamber during movement of said piston means from said start position to said charged position and for preventing reverse flow of liquid from said charging chamber through said inlet means; sequencing means for sequentially: supplying air to said air actuation chamber to move said piston means from said start position to said charged position to fill said charging chamber with liquid, supplying air to said mixing chamber while venting said air actuation chamber to move said piston means from said charged position to said start position while liquid enters said mixing chamber through said timing means and is mixed with air to form the air/liquid mixture which flows out said first fluid passage means; said valving means including a first one-way check valve and said liquid inlet means including a second one-way check valve; said housing means defining a stem chamber; a stem slidably supported in said stem chamber; said stem being connected to said piston means and extending through said mixing chamber for movement with said piston means between said start and charged positions; and air valve means disposed in said stem chamber and actuatable by said stem for allowing air to flow therepast and into said stem chamber when said piston means is in said charged position.

13. An assembly as set forth in claim 12 wherein said stem chamber includes at least one fluid flow port which is opened and closed by said stem during movement thereof in said stem chamber.

14. An assembly comprising: a housing defining a stem chamber, a stem supported in sealing engagement in said stem chamber for sliding movement between first and second positions, an accumulator chamber in fluid communication with said stem chamber, air valve means disposed in said stem chamber and actuatable by said stem in said first position for allowing air to flow therethrough and into said stem chamber and into said accumulator chamber, a timing port in fluid communication with said stem chamber and closed by said stem when said stem is in said first position and open to said stem chamber and said accumulator chamber when said stem is in said second position.

15. An assembly as set forth in claim 14 including a control device in communication with said timing port for receiving air therefrom when said timing port is open.

16. An assembly as set forth in claim 15 wherein said control device comprises a selector valve means for directing flow to one of alternative flow paths.

17. A gas/liquid mixing assembly comprising; housing means defining a cavity, a piston slidably disposed in said cavity, said piston having a large area end defining a mixing chamber within said cavity and a small area end defining a charging chamber within said cavity, means for conveying liquid from said charging chamber to said mixing chamber, said piston defining an air actuation chamber within said cavity, and control means for supplying air to said actuation chamber for moving said piston to expand said charging chamber to charge said charging chamber with liquid and for thereafter venting said actuation chamber and supplying air to said mixing chamber for moving said piston into said charging chamber for mixing the liquid with the gas in said mixing chamber.

* * * * *